(12) United States Patent
Schloegel et al.

(10) Patent No.: US 11,047,212 B2
(45) Date of Patent: Jun. 29, 2021

(54) ASSEMBLY WITH TWO ENERGY GUIDE CHAINS AND ADJUSTABLE FIXED POINT

(71) Applicant: igus GmbH, Cologne (DE)

(72) Inventors: Frank Schloegel, Cologne (DE); Tim Schneebeck, Duisburg (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 16/627,384

(22) PCT Filed: Jun. 28, 2018

(86) PCT No.: PCT/EP2018/067444
§ 371 (c)(1),
(2) Date: Dec. 30, 2019

(87) PCT Pub. No.: WO2019/002481
PCT Pub. Date: Jan. 3, 2019

(65) Prior Publication Data
US 2020/0270968 A1 Aug. 27, 2020

(30) Foreign Application Priority Data

Jun. 28, 2017 (DE) ...................... 20 2017 103 858.0

(51) Int. Cl.
*E21B 41/00* (2006.01)
*E21B 3/02* (2006.01)
*E21B 15/00* (2006.01)

(52) U.S. Cl.
CPC .............. *E21B 41/00* (2013.01); *E21B 3/022* (2020.05); *E21B 15/00* (2013.01)

(58) Field of Classification Search
CPC . E21B 15/00; E21B 3/02; E21B 3/022; E21B 41/00; F16G 13/16; H02G 11/006
See application file for complete search history.

(56) References Cited

U.S. PATENT DOCUMENTS

| 3,337,696 A | 8/1967 | Waninger et al. |
| 4,373,324 A * | 2/1983 | Janos .................. H02G 11/006 59/78.1 |

(Continued)

FOREIGN PATENT DOCUMENTS

| DE | 1239539 | 9/1962 |
| DE | 10252702 | 5/2004 |

(Continued)

OTHER PUBLICATIONS

International Search Report from corresponding PCT Appln. No. PCT/EP2018/067444, dated Nov. 23, 2018.

(Continued)

*Primary Examiner* — James G Sayre
(74) *Attorney, Agent, or Firm* — Grossman, Tucker, Perreault & Pfleger, PLLC

(57) ABSTRACT

The invention relates to an arrangement for the cable supply of a movable consumer, in particular in vertical applications, such as for example a drilling rig or the like. A main energy guide chain (10) guides at least one cable between a first connection point (6) and a second connection point (7) that is movable relative thereto, wherein said second connection point is moved between a first end position (4) and a second end position (5) of the consumer. According to the invention, a displaceable carriage (20) with an additional auxiliary energy guide chain (14) is provided for guiding the at least one cable between a third connection point (8) on the displaceable carriage and a stationary fourth connection point (9). This allows a retraction of the main energy guide chain (10) between an operating position and a parking position.

14 Claims, 3 Drawing Sheets

(56) References Cited

U.S. PATENT DOCUMENTS

| | | | |
|---|---|---|---|
| 6,016,844 A * | 1/2000 | Takahashi | H02G 11/006 138/120 |
| 6,581,698 B1 | 6/2003 | Dirks | |
| 7,434,382 B2 | 10/2008 | Iwami et al. | |
| 9,879,758 B2 | 1/2018 | Spies et al. | |
| 2005/0155337 A1* | 7/2005 | Worms | F16G 13/16 59/78.1 |
| 2006/0042175 A1* | 3/2006 | Crespi | H02G 11/00 52/111 |
| 2008/0184932 A1* | 8/2008 | Albrecht | B05B 13/0431 118/500 |

FOREIGN PATENT DOCUMENTS

| | | |
|---|---|---|
| DE | 102004040162 | 3/2006 |
| DE | 102006029530 | 1/2007 |
| DE | 102008031430 | 1/2009 |
| DE | 102009043081 | 3/2011 |
| DE | 202012001228 | 5/2012 |
| DE | 202014105136 | 11/2014 |
| EP | 0308758 | 3/1989 |
| EP | 1108110 | 11/2003 |
| WO | 2015/144727 | 10/2015 |

OTHER PUBLICATIONS

International Preliminary Report on Patentability from corresponding PCT Appln. No. PCT/EP2018/067444, dated Nov. 23, 2018.

* cited by examiner

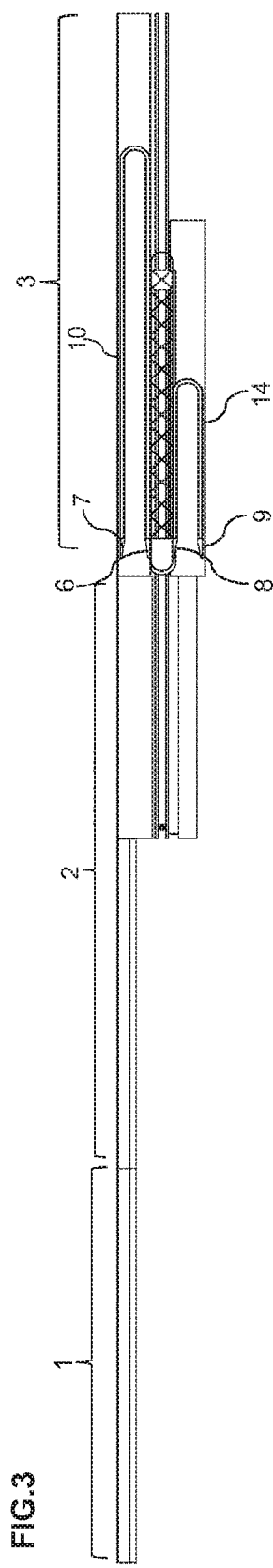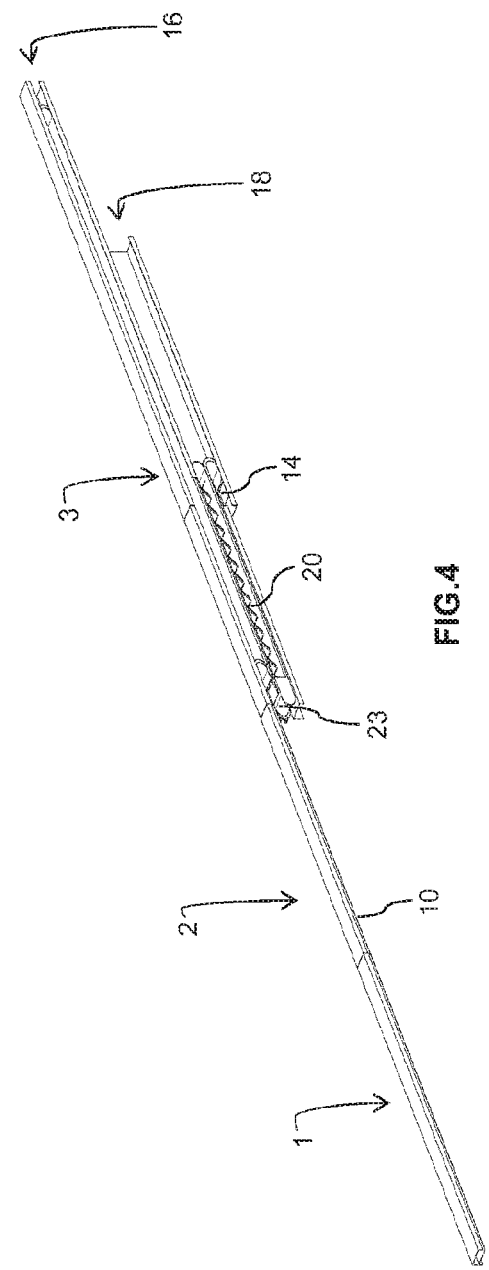

ASSEMBLY WITH TWO ENERGY GUIDE CHAINS AND ADJUSTABLE FIXED POINT

The invention relates to an assembly comprising an energy chain for supplying power to a mobile load, in particular a vertically displaceable load, such as a top drive for driving the drill string of a drilling rig, as shown for example in EP 1 108 110 B1, or in other applications having a long travel path.

In conventional assemblies, an energy chain usually composed of pivotably interconnected chain links that define a receiving space is provided for the purpose of protected guidance of one or more cables between a first connection point, typically the so-called fixed point, and a second connection point that is movable relative to said fixed point and is usually referred to as the entrainment member. In this case, the energy chain typically forms a deflection arc that can be moved between two strands and has a predetermined radius. Said energy chain thus protects the cables inter alia from kinking. The entrainment member moves, together with the load, between a first end position and a second end position, along an intended travel path of the load. In this case, the first end of the energy chain is typically fastened to the first connection point or fixed point, and the second end is typically fastened to the second connection point or entrainment member.

Assemblies of this kind are widespread in many applications, e.g. also in gantry cranes, cranes comprising jib arms, and other machines having a relatively long travel path.

A guide system for extendable and retractable cantilever machines such as cranes, floating platforms and the like was proposed in the patent specification EP 0 308 758 A2, in order to assist flexible hoses and cables that supply power to a load at the outermost end of a jib. A cable guide assembly specifically for telescopic jibs is also known from the utility model DE 20 2014 105 136 U1.

Retracting the system for guiding cables to a compact length may also be desirable in other applications that are not telescopic, for example in order to facilitate transport of the machine or the individual components thereof.

Furthermore, guides, in particular guide channels, for energy chains are known which specify or stabilize the course of the energy chain. Retractable and extendable guides are also already known in this context. WO 2015/144727 A1 discloses, for example, a guide channel by means of which the energy chain can be retracted to an installation length that is significantly shorter than the travel path. A further approach is described for example in DE 102 52 702 A1, specifically an energy chain comprising a carrier assembly on which the chain is retained and guided, and which comprises a stationary main carrier structure having a telescopic rail that is displaceably mounted thereon. For the purpose of retraction and extension, a suspension part on which the energy chain is retained slides along the telescopic rail. However, the two last-mentioned solutions are not readily suitable for vertically displaceable loads, in particular having a long travel path.

A first object of the invention is therefore that of developing an assembly comprising an energy chain such that the assembly can be retracted in a compact manner. In this case, it is intended for retraction to be possible to a noticeably shorter overall length in a retracted state—compared with half the length of the intended travel path—and for the assembly to be particularly suitable for vertical applications.

According to a first aspect of the invention, the object mentioned at the outset is achieved simply in that first of all the first connection point which, in the case of conventional energy chains, forms what is known as the fixed point, is provided on a displaceable carriage, and a third connection point is also provided on said carriage. In this case, the carriage is displaceable between an operating position which is located in the central region between the first and the second end position, and a parked position between the operating position and the second end position, in particular in parallel with the travel path and independently of the load. Furthermore, according to the invention an additional auxiliary energy chain is provided for protected guidance of the at least one cable between the additional third connection point on the displaceable carriage and a stationary fourth connection point. The auxiliary energy chain can in particular be fastened to the third connection point by one end and to the fourth connection point by the other end.

In this assembly, the energy chain which is known per se forms a type of "main energy chain" which is intended to be provided for displaceable operation of the load and in which the cable(s) is/are guided. In this case, the additional auxiliary energy chain is used primarily for retracting the first connection point of the main energy chain, which is fixed in operation, into a retracted parked position which is remote from the operating position of the first connection point. By virtue of the carriage and the additional or separate auxiliary energy chain, the main energy chain can itself also be retracted into a retracted parked position. In this case, the fourth stationary connection point can fulfil the function of a fixed point that is actually fixed in location, and the second connection point that is provided on the carriage acts as a variable fixed point, as it were, which can be fixed in space in nominal operation but if necessary can be retracted or adjusted into a more compact parked position.

Depending on the application and the length ratio of the two chains it is thus possible to achieve a retracted installation length that is significantly shorter and more compact compared with the typically required half length of the desired travel path. Compared with known configurations, for example for telescopic jibs, the proposed solution is of a significantly simpler, and thus more cost-effective, design. Preferably only or precisely one carriage and only or precisely one auxiliary energy chain are provided.

Depending on space conditions, the auxiliary energy chain is preferably arranged on the opposite side of the carriage. Alternatively, both chains can also extend next to one another, on the same side.

In an advantageous development, the installation length of the auxiliary energy chain is at least a quarter shorter than the installation length of the main energy chain, in particular approximately half the length thereof. The installation length of the auxiliary energy chain can preferably be in the region of at least 25%, in particular approximately 30% to at most 75%, in particular up to approximately 50% of the installation length of the main energy chain.

An embodiment in which the two energy chains are of approximately the same length is also conceivable in theory, in particular if the carriage can be moved from the parked position into two or more different operating positions, i.e. the variable fixed point is adjustable in a plurality of steps, as it were, in order to increase the overall range. However, in a particularly simple embodiment having just one operating position of the mobile carriage, the auxiliary energy chain is typically approximately half the length of the main energy chain, possibly minus a length on the carriage over which the cables can be guided by the carriage itself.

The installation length of the carriage in the displacement direction is preferably approximately or at least half the length of the auxiliary energy chain. In the case of a relatively long carriage, the energy chains can be supported on both sides. Furthermore, if required the cables can be guided in a protected manner over a longitudinal portion, on the carriage, in order for example to reduce the installation length of the auxiliary energy chain. The width of the carriage transversely to the travel direction preferably corresponds to approximately twice the radius of the deflection arcs of the energy chain. The chains preferably have an identical radius in the deflection arc and/or have direction arcs that are oriented in the same direction.

In a robust embodiment, the carriage is assigned its own longitudinal guide, substantially in parallel with the travel path of the main energy chain. Said guide can, in particular in a manner corresponding to the length of the auxiliary energy chain, extend over approximately a quarter to a third of the distance from the central region, i.e. the region having the nominal operating position between the first and the second end position, to the second end position.

In combination therewith or independently thereof, it is advantageous for the carriage to comprise a locking device, by means of which said carriage is fixed in the or each operating position and preferably also in the parked position. The carriage can in particular be locked or fixed on the longitudinal guide that interacts with the carriage. In actual operation, the auxiliary energy chain is intended not to move together with the main energy chain, since said main energy chain is intended to comprise a fixed point in the conventional manner Thus, the first connection point of the main energy chain that is provided on the displaceable carriage can be simply made stationary or fixed by means of locking, during operation. This can be achieved manually or automatically. In this case, any suitable locking element is possible, for example a simple crossbar or locking bolt which secures against longitudinal displacement.

The longitudinal guide of the carriage can be arranged centrally between two guide channels, as a linear guide, e.g. as a guide rail, a plain bearing with a profile rail, or the like, which are provided for improved guidance both of the main energy chain and of the auxiliary energy chain. Suitable guide channels are known per se. The locking device can optionally interact with the longitudinal guide.

In order to save weight, in particular in the case of very long travel paths, the two energy chains are preferably produced from plastics links and the guide channels are preferably produced from light metal, in particular aluminum. For high tractive force requirements, in particular in the case of a high cable weight in a vertical application, it is expedient for the energy chains to be produced from fiber-reinforced plastics material, e.g. in an injection-molding process.

A good load relief and a long service life of the cables with respect to tractive forces is achieved if the carriage in each case comprises at least one corresponding strain relief element for each of its connection points, in order to relieve the load of the tractive force on the guided cable(s) on the carriage. In this case, the main and the auxiliary energy chain can each comprise end fastening links which form the first and the third connection point, respectively, on the carriage. End fastening links of this kind can preferably comprise a plurality of separate strain relief elements for the received cables. Suitable fastening links reduce the manufacturing effort for the carriage itself.

In an application that is particularly suitable for example for a drilling rig, at least three separate jib or mast longitudinal segments or the like (in the following "segments", for short), which segments are connectable in the longitudinal direction, may be provided, forming for example the segments of a drilling rig. In this case, the two end positions for the actual operation of the main energy chain can in each case be located in the end region, at one of two outer segments. In this application, the parked position can be located on or in only one segment, specifically the outer segment having the second end position, on which the fourth connection point is also provided in a stationary manner. As a result, the assembly for cable guidance can retract fully to the length of just one segment, specifically the outer segment having the parked position.

In an advantageous development, the assembly for cable guidance is preferably received completely in an internal space within the segments. As a result, a design can be achieved that is transportable in a particularly compact manner, and is protected both in operation and during transport.

Thus, following assembly or during actual operation of the main energy chain, the carriage can be extended into an operating position, in a different segment from that having the parked position, e.g. in a central one of three connected segments, and be locked there.

For the purpose of extension and optionally also retraction, the assembly preferably comprises a drive and, in particular for vertical movement, lifting gear, in particular a hoist, for lifting the carriage together with the energy chain, fastened thereto, from the parked position into the operating position and back. In this case, a saddle-like deflection region comprising at least one lifting eye is advantageously provided on a first end region of the carriage that is remote from the parked position. The lifting eye allows for connection, if required, with the lifting gear, e.g. a crane hook of a cable winch.

A saddle-like deflection region can be provided for protected deflection of the guided cables between the two connection points on the carriage.

According to a design that is favorable with respect to the cable guidance, the first connection point and the third connection point are provided so as to be substantially opposing, at the first end region of the carriage, in particular the end region remote from the parked position. The carriage can comprise, therebetween, a deflection region for the guided cable(s). A cable length that is approximately the same on either side of the deflection region on the carriage optimizes the weight distribution on the carriage, for example with respect to tilting moments on the longitudinal guide.

In order to achieve additional guidance of the energy chain within the assembly, it is advantageous for the carriage to have a longitudinal extension over at least 50%, preferably at least 75%, of the installation length of the auxiliary energy chain. In the case of a corresponding installation length of the carriage, correspondingly long profiled plates or guide plates similar to a guide channel may be provided on the carriage itself. Said plates can absorb for example undesired lateral swiveling movements of the energy chain during vertical travel.

Accordingly, in a development the carriage comprises a profiled plate in the form of a guide plate for guiding the main or the auxiliary energy chain, on both sides, wherein the profiled plates can in particular form parts of a guide channel and represent a predominant portion of the longitudinal extension of the carriage.

In order to reduce the weight of the displaceable carriage itself, in this case the profiled plates can preferably be held in parallel with one another by means of a framework made for example of diagonal metal struts, and be connected to a stable frame.

The proposed assembly is particularly suitable for dynamic guidance of a plurality of cables between connection points that are movable in a relative manner, in particular for a cable bundle, comprising at least one power supply cable and a control or data line. In this case, the cables are guided from the fourth connection point, through the auxiliary energy chain, via the carriage, and further through the main energy chain, to the entrainment member or second connection point, in an interruption-free continuous manner, and in a manner protected by the energy chains. In addition to electrical cables, fiber-optic cables or tubes, for example for hydraulic or pneumatic consumers, are also possible.

The proposed assembly is particularly suitable for use in a drilling rig, in particular a deep drilling rig, that is composed of a plurality of segments and can be transported in individual parts. In such a case, the main energy chain, the carriage and the auxiliary energy chain can be retracted into a parked position, within a bottom segment. Said segment is preferably of a slightly greater installation length than the other segments, in order to facilitate complete reception of the above-mentioned components of the assembly in the cable guide.

The assembly can in particular, but not exclusively, be used for example for supplying power to a top drive in a drilling rig, and optionally also for data exchange mit control and measuring signals. The use in drilling rigs exhibits particular advantages, in which the top drive is displaceable over a vertical stroke of at least 30 m, i.e. the segments each have an installation length of over 10 m. In this case, length-based reductions of over 5 m can be achieved, allowing, for the first time, for transport for example in a 40 ft ISO container.

In the case of a conventional assembly of an energy chain, two such segments of significant length had to be transported together if the assembly for cable guidance was not intended to be separately dismantled, for each time the upper run was disassembled, and attached again after assembly, or one would have to use only two segments that were correspondingly 50% longer. The resulting advantage with respect to the protected guidance of the cables when transporting the dismantled segments of the drilling rig should also be taken into account, i.e. when the assembly for cable guidance is brought into the retracted parked position and optionally securely fixed there. This is a significant advantage in particular in the case of sensitive cables, since it is not necessary to dismantle the energy chain assembly.

Further details, features and advantages of the invention can be found in the following detailed description of a preferred embodiment, with reference to the accompanying figures. In the schematic figures:

FIG. 3 is a longitudinal section corresponding to FIG. 2B, comprising the main energy chain and an auxiliary energy chain in a retracted parked position compared with FIG. 2A-2B;

FIG. 4 is a perspective view corresponding to FIG. 2A;

Figure 1:
FIG. 1 is a side view of a multi-part drilling rig that is composed of three mast segments.

FIG. 1 schematically shows, as a usage example, a drilling rig that is to be erected vertically and is made of three longitudinal segments 1, 2, 3 which can be transported separately and are assembled in a stable manner in the longitudinal direction. The bottommost segment 3 is of a slightly greater installation length than the central segment 2, and the top segment 1 can be shorter than or the same length as segment 2. The segments 1, 2, 3 form a hollow space in the interior and are designed for example in the manner of a supporting framework. For the purpose of simplicity, typical details of the segments 1, 2, 3 that are known per se are not shown. In particular, a load that can be displaced from the top end point 4 to the bottom end point 5, such as the drive for a drill, in particular a top drive, is not shown in greater detail.

In order to supply power to the load (not shown), a main energy chain 10 is provided and is fastened by a first end fastening link to a first connection point 6 which is fixed so as to be immovable relative to the segments 1, 2, 3 during operation. The other end fastening link of the main energy chain 10 is fastened to the load-side second connection point 7 or entrainment member which moves together with the load. The main energy chain 10 forms a deflection arc 11, having a predefined radius, between two runs of variable length, in order to support the guided cables (not shown) which extend in a guided manner inside the main energy chain 10.

Figure 2A:
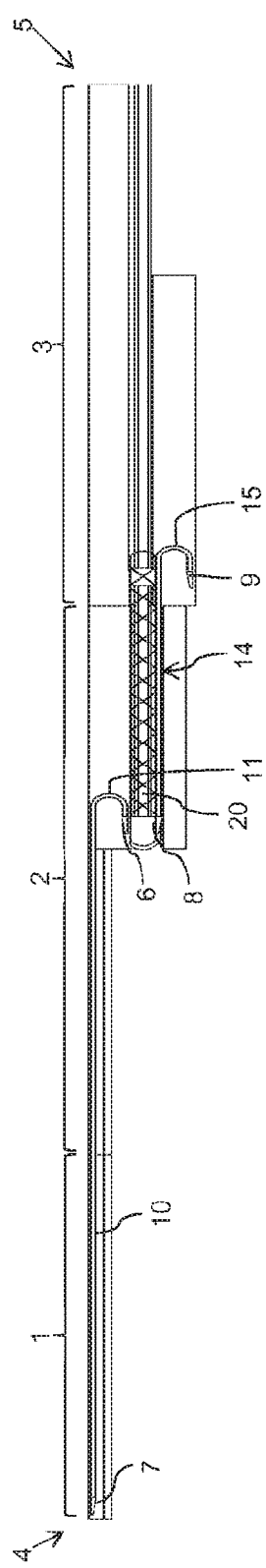
FIG. 2A-2B are schematic longitudinal sections according to cutting lines E-E and D-D, respectively, according to FIG. 1, comprising a main energy chain in operation, in a first end position (FIG. 2A, top) and in a second end position (FIG. 2B, bottom), wherein only the essential components are shown.
Figure 2B:
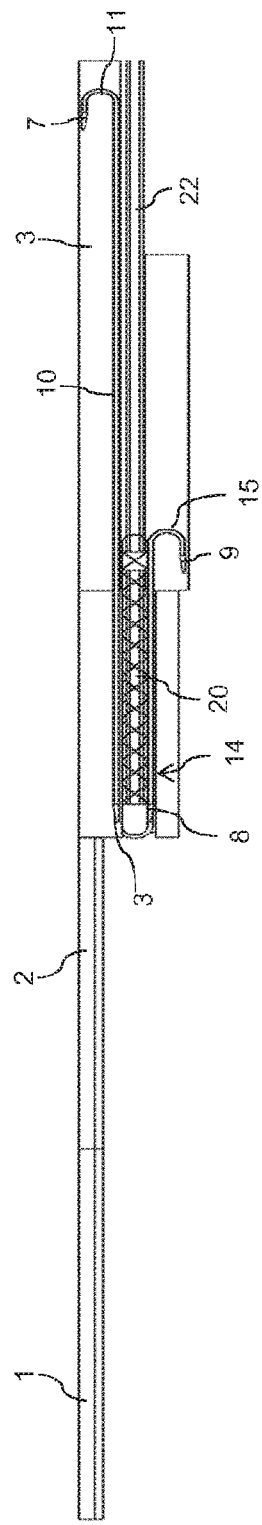

In this case, the first connection point 6 is formed by a movable carriage 20 which is displaceably mounted inside the segments 2, 3, on a longitudinal guide 22 (FIG. 5A-6B), in parallel with the travel direction and independently of the intended displacement of the load. As a result, the position of the first connection point 6 which, during operation, represents the fixed point for the main energy chain 10, is also displaceable, since it is arranged in a fixed manner on the carriage 20. In this case, the carriage 20 is displaceable between an operating position which, as shown in FIG. 2A-2B, is located in the central region between the first end position (FIG. 2A) and the second end position (FIG. 2B) of the entrainment member 7, and a parked position which is shown in FIG. 3. The parked position according to FIG. 3 is located completely within the bottommost segment 3 and thus between the operating position of the carriage 20 in FIG. 2A/2B and the second end position of the entrainment member 7. Elements for relieving the load of the tractive force (not shown), of a design that is known per se, are provided, for the cables, at all the connection points 6, 7, 8 and 9, for example provided by the end fastening links of the energy chains 10, 14.

The displaceable carriage 20 comprises a third connection point 8 opposite the first connection point 6, from which third connection point the guided cables are guided in a further separate auxiliary energy chain 14 to a stationary fourth connection point 9 on the bottommost segment 3. The auxiliary energy chain 14 also forms a deflection arc 15 and can be structurally identical to the main energy chain 10 but is of a significantly smaller overall length, e.g. approximately 50-60% of the installation length of the segment 3, and less than 50% of the length of the main energy chain 10. Thus, all necessary cables can be guided by the main energy chain 10, via an additional deflection arc 23 (FIG. 5A) at the first end region of the carriage 20, in a manner supported and protected by the auxiliary energy chain 14, from the variable first connection point 6 to the stationary fourth connection point 9, even during retraction and extension with respect to the parked position, within the bottom segment 3, cf. FIG. 3. During actual operation of the main energy chain 10, in the example shown the auxiliary energy chain 14 does not move. In particular, however, in the case of more than four segments 1, 2, 3, etc., a stepwise adjustment of the carriage 20 having different operating lengths for the first connection point 6 is also conceivable, without a longer main energy chain 10 being required in this case.

As can be seen in particular in FIG. 3, the overall assembly for cable guidance can be retracted to the length of the bottommost segment 3, which is significantly shorter compared with the overall length of all segments 1, 2, 3 and is only 33-40% of the overall length or the travel path of the entrainment member 7. Furthermore, the overall assembly comprising the two energy chains 10, 14, the guided cables (not shown) and the movable carriage 20 can be transported together with the segment 3, in a manner protected inside the hollow space thereof. It is thus also not necessary to dismantle the cable guide assembly in order to transport the tower-like device made of the segments 1, 2, 3, and to subsequently mount it again during assembly, which significantly reduces the assembly time and furthermore prevents damage to the cables.

Figure 7A:
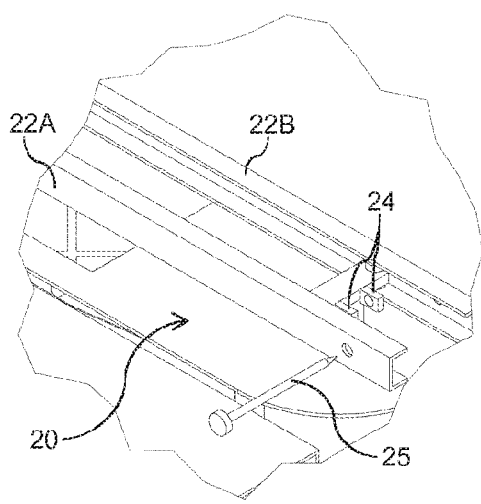
FIG. 7A-7B are perspective partial views of a locking device for fixing the carriage on the longitudinal guide thereof.
Figure 7B:
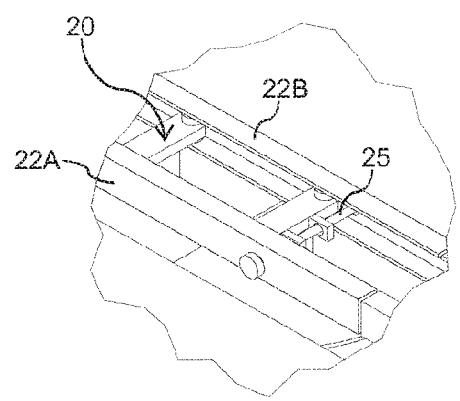

As can be seen most clearly from FIG. 7A-7B, retaining tabs 24 are provided on the first and/or second end region of the carriage 20. Aligned bores in opposite U-profile rails 22A, 22B of the longitudinal guide 22 allow for a locking bolt 25 to be inserted into the retaining tabs 24 in order to secure the carriage 20 against longitudinal displacement, in the predetermined position of the operating position (FIG. 2A/2B) and the parked position according to FIG. 3. As is clear from FIG. 6A-6B, the longitudinal guide 22 is also provided approximately centrally and so as to be laterally offset, between a first guide channel 16 for the main energy chain 10 and a shorter second guide channel 18 for the auxiliary energy chain 14, and is designed as a guide rail. At least the end regions of the carriage 20 engage in the profile rails 22A, 22B of the longitudinal guide 22 by means of guide elements 26, and are guided therein in the manner of a sliding guide.

The two energy chains 10, 14 are preferably of an identical design that is known per se, made of individual plastics chain links, e.g. of the E4/00 or E2/00 type by the company igus GmbH, D-51147, Cologne, or according to WO 00/63586 A1 or EP 0711388 B1, to the contents of which reference is made, for the purpose of brevity, with respect to the structure of the chain links. The links of the two energy chains 10, 14 are preferably composed of injection-molded parts made of plastics material.

In order to reduce weight, the guide channels 16, 18 are preferably produced from opposite C- or U-profiles made of light sheet metal, in particular aluminum. In this case, the longer guide channel 16 preferably has profiles that align accordingly with each of the segments 1, 2, 3, on the side remote from the carriage 20, as is shown in FIG. 4. A corresponding profile is provided on the opposite side, at least in the bottom segment 3. Furthermore, the carriage 20 likewise comprises a corresponding profile on said longitudinal side that faces the main energy chain 10, in order to extend the length, supported on both sides, into the central segment 2. The shorter guide channel 18 for the auxiliary energy chain 14 accordingly has a profile, in the bottom segment 3, that is opposite the carriage 20, and a corresponding profile on the carriage 20, facing the auxiliary energy chain 14.

Figure 5A:
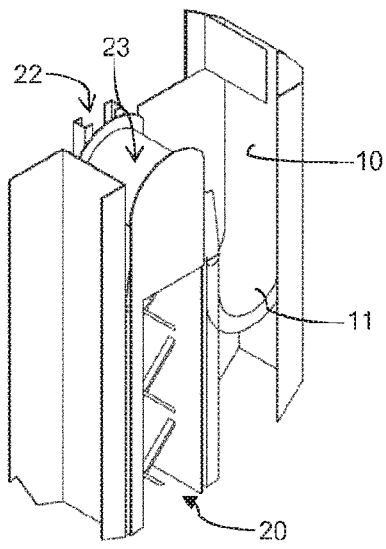
FIG. 5A-5B are perspective partial details from FIG. 2A, showing a displaceable carriage in more detail, in a first end region (FIG. 5A: top end) and in a second end region (FIG. 5B: bottom end)
Figure 5B:
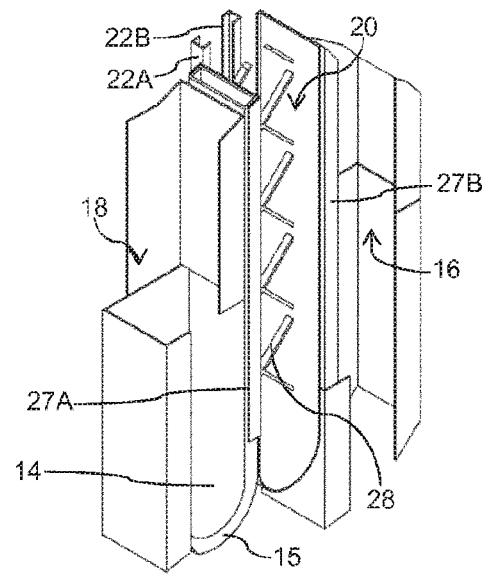
Figure 6A:
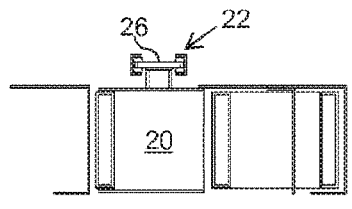
FIG. 6A-6B are cross-sections through the assembly in the partial details according to FIG. 5A-5B.
Figure 6B:
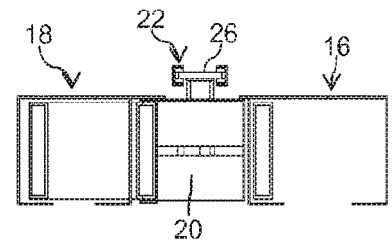

In this case, the elongate carriage 20 can substantially be formed by the two profiled plates 27A, 27B of the guide channel 16 or 18, respectively, that face away from one another, and an intermediate reinforcement in the form of a framework made of metal struts 28, which allows for a structure that is simultaneously stable and lightweight. The profiled plates 27A, 27B can be produced integrally with the deflection arc 23. The deflection arc 23 has a radius that is approximately the same as the deflection arcs 11, 15. In addition to the outer profiles of the guide channel 16, 18 and the profiled plates 27A, 27B, as shown in FIG. 5-6 further profiled plates can be provided on the segments 2, 3, relative to which the profiled plates 27A, 27B of the carriage 20 are telescopically retractable and extendable.

The assembly shown, comprising a main and an auxiliary energy chain for achieving a variably adjustable fixed point, is suitable in particular for tower-like machines or equipment having a large overall length, for example at least 30 m, which is intended to be transported in individual parts.

LIST OF REFERENCE NUMERALS

FIG. 1-7:
1, 2, 3 longitudinal segments
4, 5 end positions
6 first connection point (variable fixed point)
7 second connection point (entrainment member)
8 third connection point
9 fourth connection point (stationary fixed point)
10 main energy chain
11 deflection arc
14 auxiliary energy chain
15 deflection arc
16 long guide channel (of the main energy chain)
18 short guide channel (of the auxiliary energy chain)
20 carriage
22 longitudinal guide
22A, 22B profile rails
23 deflection arc
24 locking tabs
25 locking bolts
26 guide element
27A, 27B profiled plates
28 framework transverse struts

What is claimed is:
1. An assembly for supplying power to a mobile load in a vertical application, comprising:
 a main energy chain for guiding at least one cable between a first connection point and a second connection point that is movable relative thereto and travels along a travel path of the load, between a first end position and a second end position, wherein a first end of the main energy chain is fixed to the first connection point, and a second end of the main energy chain is fixed to the second connection point;
 a displaceable carriage on which the first connection point and a third connection point are provided and which is displaceable between an operating position which is located in a central region between the first end position and the second end position, and a parked position between the operating position and the second end position;

an auxiliary energy chain for guiding the at least one cable between the third connection point on the displaceable carriage and a stationary fourth connection point; and wherein the displaceable carriage is assigned its own longitudinal guide in parallel with a displacement range of the main energy chain, which extends over approximately a quarter to approximately a third of a distance from the central region, between the first end position and the second end position, towards the second end position, and the displaceable carriage comprises a locking device by which the displaceable carriage is fixed in the operating position.

2. The assembly according to claim 1, wherein the installation length of the auxiliary energy chain is at least a quarter shorter than the installation length of the main energy chain.

3. The assembly according to claim 1, wherein the carriage is fixed by the locking device in the operating position and also in the parked position on the longitudinal guide.

4. The assembly according to claim 3, wherein the longitudinal guide of the carriage is arranged, as a linear guide, centrally between two guide channels for the main and auxiliary energy chain, wherein the two energy chains are produced from plastics links.

5. The assembly according to claim 3, wherein the carriage is locked in the operating position in a central one of the three connected segments, during operation of the main energy chain.

6. The assembly according to claim 1, wherein the main and the auxiliary energy chain each comprise end fastening links which form the first and the third connection point on the carriage, and the carriage in each case comprises at least one corresponding strain relief element for each of said connection points in order to relieve the tractive force on the guided cable(s) on the carriage.

7. The assembly according to claim 6, wherein the first connection point and the third connection point are provided opposite one another on the first end region of the carriage, and the carriage forms a deflection arc therebetween for the guided cable(s).

8. The assembly according to claim 1, wherein at least three segments are provided, which can be connected in the longitudinal direction to form a mast, in that the two end positions are in each case located on an outer one of the connected segments, and in that the parked position is located on the outer segment with the second end position, on which segment the fourth connection point is fixed in position, wherein the assembly is received in an internal space of the segments.

9. The assembly according to claim 1, further comprising lifting gear, in particular a hoist, for lifting the carriage, together with the energy chains fastened thereto, from the parked position into the operating position.

10. The assembly according to claim 1, wherein the carriage has a longitudinal extension over at least 50% of the installation length of the auxiliary energy chain.

11. The assembly according to claim 10, wherein the carriage in each case comprises a profiled plate on both sides, for guiding the main or the auxiliary energy chain, which form a predominant portion of the longitudinal extension, wherein the profiled plates are retained in parallel by a framework made of metal struts.

12. The assembly according to claim 1, wherein multiple cables, including at least one power supply cable and one control line, are guided in an interruption-free and continuous manner from the fourth connection point, through the auxiliary energy chain, via the carriage and through the main energy chain, to the second connection point.

13. A drilling rig composed of multiple segments, comprising an assembly according to claim 1, wherein the main energy chain, the carriage and the auxiliary energy chain can be retracted into a parked position, inside a bottom segment.

14. A use of an assembly, according to claim 1, for supplying power and control signals to a top drive in a drilling rig, wherein the top drive is displaceable over a vertical stroke of at least 30 m.

* * * * *